United States Patent [19]

Kanno et al.

[11] Patent Number: 6,077,482
[45] Date of Patent: Jun. 20, 2000

[54] METHOD FOR TREATING ORGANOHALOGEN COMPOUNDS WITH CATALYST

[75] Inventors: Shuichi Kanno; Hiroshi Kawagoshi, both of Hitachi; Akira Kato, Mito; Toshiaki Arato, Hitachinaka; Hisao Yamashita; Shigeru Azuhata, both of Hitachi; Shin Tamata, Ooarai-machi, all of Japan

[73] Assignee: Hitachi, Ltd., Tokyo, Japan

[21] Appl. No.: 09/004,981

[22] Filed: Jan. 9, 1998

Related U.S. Application Data

[62] Division of application No. 08/572,878, Dec. 18, 1995, Pat. No. 5,759,504.

[30] Foreign Application Priority Data

Dec. 28, 1994 [JP] Japan .................................... 6-327177

[51] Int. Cl.$^7$ .............................. B01D 53/70; B01J 23/64
[52] U.S. Cl. .......................... 422/173; 422/174; 422/177; 422/198; 422/199; 422/211; 502/309; 588/206; 588/226
[58] Field of Search ..................................... 422/199, 211, 422/171, 177, 189, 174, 173; 588/209, 226, 248; 423/659, 481; 570/227, 229; 502/309

[56] References Cited

U.S. PATENT DOCUMENTS

| | | | |
|---|---|---|---|
| 4,085,193 | 4/1978 | Nakajima et al. | 423/239 |
| 4,209,496 | 6/1980 | Carpenter et al. | 423/210 |
| 5,015,457 | 5/1991 | Langhoff et al. | 423/488 |
| 5,176,897 | 1/1993 | Lester | 423/659 |
| 5,292,704 | 3/1994 | Lester | 502/309 |
| 5,430,230 | 7/1995 | Mitsui et al. | 588/206 |
| 5,582,809 | 12/1996 | Rikimaru et al. | 423/239.1 |

FOREIGN PATENT DOCUMENTS

| 3-47516 | 2/1991 | Japan . |
|---|---|---|
| 6-59388 | 8/1994 | Japan . |

*Primary Examiner*—Hien Tran
*Attorney, Agent, or Firm*—Antonelli, Terry, Stout & Kraus, LLP

[57] ABSTRACT

A treating apparatus for decomposing organohalogen compounds such as chlorofluorocarbons (CFC's), trichloroethylene, methylbromide, halon, and the like, effectively, with a high activity of catalyst, is provided. The apparatus includes a reactor in which organohalogen compounds are decomposed by contact at a temperature in a range of 200°~500° C. with a catalyst which comprises titania and tungsten oxide by an atomic ratio of Ti and W in a range from 20 mol % to 95 mol % Ti and from 5 mol % to 80 mol % W, with at least the surface of the titania being covered with a porous layer of the tungsten oxide. In accordance with the present invention, organic compounds containing any of fluorine, chlorine and bromine will be decomposed with a high efficiency, and the activity of the catalyst can be maintained for a long time.

11 Claims, 8 Drawing Sheets

METHOD FOR TREATING ORGANOHALOGEN COMPOUNDS WITH CATALYST

This application is a divisional application of Ser. No. 08/572,878, filed on Dec. 18, 1995 now U.S. Pat. No. 5,759,504.

BACKGROUND OF THE INVENTION

1. Field of the Invention

The present invention relates to a treating method for decomposing halogenated organic compounds such as chlorofluorocarbons (CFC group, for instance flon), trichloroethylene, methyl bromide, and halon by making the compounds contact with catalyst effectively. Further, the present invention relates to the catalyst used in the treating method for decomposing organohalogen compounds, a preparing method thereof, and treating apparatus for the decomposition.

2. Description of the Prior Art

Organohalogen compounds containing fluorine, chlorine, or bromine such as chlorofluorocarbons, trichloroethylene, methyl bromide, halon, and the like are widely used as foaming agents, refrigerants, fire extinguisher, fumigants, and the like. However, the above described organohalogen compounds cause destruction of the ozone layer, and have serious influences such as generation of carcinogens and the like to the environment.

Therefore, various treating methods for recovering and decomposing the organohalogen compounds have been investigated. As treating methods for decomposing organohalogen compounds, a method using catalyst, a method using combustion at high temperature such as 800~900° C., a method using plasma, and others are well known. Among them, the methods using combustion and plasma consume a large amount of fuel, and electric power, and have low energy efficiencies. Further, these methods have a problem such that reactor walls are damaged by generated corrosive halogens. Especially, the method using plasma has a large amount of energy loss because a high temperature exceeding 6000° C. is used. On the contrary, the method using catalyst is a superior method if the catalyst has a high activity because only a small amount of energy is required.

As for the method using catalyst, a method using catalyst containing titania was disclosed in JP-B-6-59388 (1994). A catalyst containing titania and tungsten oxide, and a catalyst containing titania and vanadium oxide are described in the reference. However, organohalogen compounds to be contacted with the above disclosed catalysts are restricted to the organohalogen compounds having only one carbon atom with no carbon-hydrogen bond in a gas flow state, and embodiments in the reference showed only a case for treating carbontetrachloride of ppm order. The catalyst containing titania and tungsten oxide is defined as $TiO_2$ containing tungsten oxide as W metal by a content of about 0.1~20% by weight (if converted to atomic percentage, Ti within a range from 92 mol % to 99.96 mol %, W within a range from 0.04 mol % to 8 mol %).

As for catalytic poison of the organohalogen compounds, fluorine compounds have larger influence than chlorine compounds. Accordingly, a catalyst which has a high activity to the organohalogen compounds containing not only chlorine, but also fluorine, bromine, and the like, is required. Further, the catalyst having a continuity in its activity is desired.

SUMMARY OF THE INVENTION

OBJECTS OF THE INVENTION

One of the objects of the present invention is to provide a treating method for decomposing organohalogen compounds by making the compounds contact with catalyst having a high activity not only for organochlorocompounds, but also for organofluorocompounds and organobromocompounds, and a continuity of the activity.

Further, one of the objects of the present invention is to provide a preparing method for the above catalyst, and treating apparatus for decomposing organohalogen compounds.

Methods for Solving the Problem

Features of the catalyst relating to the present invention are in that the catalyst is composed of titania and tungsten oxide by Ti in a range from 20 mol % to 95 mol %, W in a range from 80 mol % to 5 mol % in atomic ratio of Ti and W, and at least the surface of the titania is covered with porous layers of tungsten oxide.

Titanium and tungsten can be contained in a state of a mixture of oxides, or conjugated oxides. Tungsten oxides are contained mainly in a form of $WO_3$.

The present invention is based on a finding that, in order to have a high activity to all organohalogen compounds including any of halogens such as chlorine, fluorine, bromine, and the like, the contained ratio of titanium and tungsten is important, and that it is important to cover the surface of the titanium with porous layers of tungsten oxide.

The catalyst composed of titania and tungsten oxide, which is disclosed in JP-B-6-59388 (1994), is not provided with porous layers of tungsten oxide at the surface of the titania, and accordingly, the catalyst does not have any high activity to organohalogen compounds containing fluorine, bromine, and the like other than chlorine.

The porous layer of tungsten oxide in the catalyst of the present invention can exist only at the surface of $TiO_2$ particles, or at both surface and interior of the $TiO_2$ particles. Existence at both surface and interior of the $TiO_2$ particles is rather preferable. Thickness of the porous layer composed of tungsten oxide is preferably in a range of 1 Å~5 mm. If the thickness of the porous layer of tungsten oxide is too thin, $TiO_2$ is readily influenced with catalytic poison of halogens. If the thickness of the porous layer is too thick, the activity of the catalyst decreases.

The catalyst of the present invention can contain at least one of element selected from a group of sulfur, phosphorus, molybdenum, and vanadium. By adding the above element, durability of the catalyst can be improved. The above elements are preferably contained into the catalyst in a range of 0.001~30 mol % in total to titanium atoms. Sulfur as sulfates, phosphorus as phosphates, and molybdenum and vanadium as oxides are contained.

If the organohalogen compound is a molecule having a carbon atom, the atomic ratio of Ti and W is preferably in a range from 40 mol % to 90 mol % for Ti and a range from 10 mol % to 60 mol % for W. If the organohalogen compound is a molecule having two carbon atoms, because the number of halogen elements contained in the molecule increases, the atomic ratio of Ti and W is preferably in a range from 20 mol % to 85 mol % for Ti and a range from 15 mol % to 80 mol % for W in order to increase thickness of the porous layer made of $WO_3$ covering the surface of the $TiO_2$ particle.

The catalyst of the present invention can be used by being formed in various shapes such as beads, granules, pellets, and honeycombs. As for forming methods, extrusion, punch-pelletizing, roll-pelletizing, and others can be used. In forming the catalyst, binders such as alumina cement, calcium-sodium cement, other ceramics, or organic compounds can be added in order to increase mechanical strength of the catalyst, or to increase specific surface of the catalyst.

The catalyst of the present invention can be used in a condition of being impregnated into a granular carrier such as alumina and silica by impregnation and other methods. Further, the catalyst of the present invention or the granular carrier such as alumina and silica which carry the catalyst of the present invention can be used in a coated state on ceramics, honeycomb or plate made of metal.

Gist of the treating method for decomposing organohalogen compounds of the present invention is in contacting a gas flow containing organohalogen compounds with the above described catalyst at 200~500°0 C. under existence of water vapor. In accordance with the above process, the organohalogen compounds can be converted to carbon dioxide and halogenated hydrogen, or carbon monoxide, carbon dioxide, and halogenated hydrogen. When the organohalogen compound is CFC 113 (1,1,2-trichloro-1,2,2-trifluorocarbon), the compound is decomposed to carbon monoxide, carbon dioxide, and halogenated hydrogen. When the organohalogen compound is CFC 11 and CFC 12, the compound is decomposed to carbon dioxide, and halogenated hydrogen. In accordance with the treating method of the present invention, reactivity of the catalyst by halogen contained in the decomposition products of the organohalogen compounds is little, and the catalyst maintains its activity for a long time.

When contacting the gas flow containing the organohalogen compounds with the catalyst, it is desirable to make the content of the organohalogen compounds in the gas flow 30% by volume or less. If the content of the organohalogen compounds in the gas flow is higher than 30% by volume, the conversion rate of the organohalogen compounds decreases and a possibility that the organohalogen compounds releases without being decomposed becomes high. The lower limit of content of the organohalogen compounds in the gas flow is desirably at least 1000 ppm. If the content of the organohalogen compounds is less than 1000 ppm, an energy loss becomes a problem although the energy necessary for decomposition of the organohalogen compounds itself is small.

When treating the organohalogen compound containing one carbon atom, concentration of the organohalogen compound in the gas flow is especially desirable in a range of 0.1~30% by volume. When treating the organohalogen compound containing two carbon atoms, concentration of the organohalogen compound in the gas flow is especially desirable in a range of 0.1~10% by volume. In order to adjust the concentration of the organohalogen compound, addition of air, and the like, after recovery of the organohalogen compound is desirable.

The amount of water vapor is an effective amount necessary for decomposing the organohalogen compound. For instance, when decomposing the organohalogen compound containing two carbon atoms, existence of water vapor in the gas flow at least three times in mols to the organohalogen compound is preferable.

As for preparing methods of the catalyst relating to the present invention, an impregnation method wherein a solution containing W is impregnated into $TiO_2$ granules, and subsequently, the granules are calcined to convert the W to $WO_3$, a method wherein a solution containing W is applied onto $TiO_2$ granules, or a vapor deposition method can be used.

When the impregnation method is used, individual fine $TiO_2$ granules coated with W ions, and uniformity is preferable. When a large amount of tungsten oxide is used, W ions are further coated onto the surface of coagulated $TiO_2$ granules which are made by coagulating individual fine $TiO_2$ granules.

When preparing the catalyst by the impregnation method, the atomic ratio of Ti and W must be within a range of 20 mol %~90 mol % for Ti and 10 mol %~80 mol % for W. In a case using the impregnation method, the surface of the $TiO_2$ granules can not be covered entirely with the porous layer of $WO_3$ if the atomic percentage of W to Ti does not exceed 10 mol %. If the surface of the $TiO_2$ granules can not be covered entirely with the porous layer of $WO_3$, a poisonous effect by halogen is generated at the surface exposed portion of the $TiO_2$ granules, for instance, $TiOF_2$ is generated at the surface exposed portion of the $TiO_2$ granules and the activity of the catalyst decreases gradually.

When the catalyst is prepared by the vapor deposition method or the application method, the porous layer of $WO_3$ can be formed on the surface of the $TiO_2$ granules with a small amount of W such as 5 mol % in atomic ratio.

In preparing the catalyst of the present invention, the catalyst is preferably prepared by using $TiO_2$ granules which are obtained by granulation. The granules obtained by granulation have inside cavities of uniform size and their porosity is readily controllable because the granules are prepared by the steps of pulverizing raw material, fabricating by pressing, pulverizing again, and screening to select granules of a desired diameter. As for the granulation, the roll-pelletizing method is most preferable.

As the raw material of Ti for preparing the catalyst of the present invention, various compounds which generate titanium oxide by heating can be used in addition to titanium oxide.

One of the effective methods is such that hydroxide precipitation is generated by adding water, ammonia water, or alkaline water solution to the titanium raw material such as titanates, titanium sulfate, titanium chloride, and organotitanium compounds, and titania is finally prepared by calcining the precipitation.

As for the raw material of W, tungsten oxide, tungstic acid, and ammonium paratungstate can be used. A raw material containing both phosphorus and tungsten such as ammonium phosphotungstate can also be used.

The catalyst of the present invention maintains its activity longer as active points in the catalyst are more acidic. Therefore, the catalyst preferably contains components to enhance acidity of the catalyst such as S, P, and the like. The S exists in a form of oxide ion such as a sulfate ion.

Even if the catalyst is composed of only $TiO_2$, the catalyst has high activity for decomposing the organohalogen compounds. However, if the organohalogen compound is an organic compound containing fluorine, the active sites form $TiOF_2$, the $TiOF_2$ releases from the catalyst, the number of the active points in the catalyst decreases, and accordingly, the activity of the catalyst decreases gradually. On the contrary, tungsten oxide hardly reacts with fluorine. Therefore, poisoning of fluorine to $TiO_2$ can be prevented by coating the $TiO_2$ with porous layers composed of tungsten oxide. Further, new strongly acidic active points which are hardly deteriorated by fluorine are generated at boundaries of the $TiO_2$ and the tungsten oxide $WO_3$.

Tungsten oxide $WO_3$ has smaller specific surface area than $TiO_2$, and accordingly, it is not effective to prepare the catalyst only by the tungsten oxide.

The organohalogen compounds which are objects of the treatment of the present invention are organic compounds containing at least one of fluorine, chlorine, and bromine, for instance, such as various chlorofluorocarbon, trichloroethylene, methyl bromide, and the like.

Taking CFC 113 and methyl bromide as examples, representative reaction formulas relating to the treating method for decomposing organohalogen compounds can be indicated as follows;

As the above formulas reveal, when the organohalogen compound containing two carbon atoms is decomposed, it is necessary to have water vapor exit in an amount of at least 3 mols to the organohalogen compound in the treated gas.

Reaction temperature, that is a temperature whereat the gas flow containing the organohalogen compound contacts with the catalyst, is preferably in a range of 200~500°0 C. Therefore, heating the gas flow containing the organohalogen compounds, or heating a reactor which contains the catalyst is preferable. If the reaction temperature exceeds 500° C., a reaction of the catalyst with fluorine starts, and the activity of the catalyst decreases gradually. The reaction temperature for decomposing the organohalogen compounds containing one carbon atom is especially preferable in a range of 250~450° C. The reaction temperature for decomposing the organohalogen compounds containing two carbon atoms is especially preferable in a range of 300~50020 C.

Reaction time for contacting the gas flow containing the organohalogen compounds is very short, for instance, one second is sufficient for decomposing the organohalogen compounds. Accordingly, a space velocity per unit time is variable in a wide range such as 500~100,000/hour. The space velocity for treating the organohalogen compound containing one carbon atom is especially preferable in a range of 1,000~50,000/hour, and the space velocity for treating the organohalogen compound containing two carbon atoms is especially preferable in a range of 500~10,000/hour.

A reactor for performing the treating method of the present invention can be of an ordinary fixed bed type, a mobile bed type, or a fluidized bed type. However, as corrosive gas such as HF, HCl, and the like are generated as decomposed gases in the process of the treating method, the reactor must be manufactured with corrosion resistant material against the above corrosive gases.

An apparatus for performing the treating method of the present invention preferably comprises, in addition to the above described reactor, means for adjusting concentration of the organohalogen compound in the gas flow, for instance, means for supplying air to the gas flow, means for heating at least one of the gas flow and the catalyst in order to contact the gas flow containing the organohalogen compound with the catalyst at a reaction temperature in a range of 200~500° C., means for supplying an effective amount of water vapor to the gas flows for decomposing the organohalogen compound, and an alkali washing vessel for washing the gas flow passing through the catalytic layer to neutralize a part of carbon dioxide and halogenated hydrogen which are decomposition products of the organohalogen compound.

After the alkali washing vessel, means for adsorbing carbon monoxide which is a decomposition product of the organohalogen compound is further preferably provided.

When the organohalogen compound is in a liquid state at the room temperature, the organohalogen compound is conducted to the catalytic layer after being heated to be in the gaseous state. As methods for heating the organohalogen compound, an electric heater can be used. Further, the organohalogen a compound and water vapor can be mixed with burning gas such as propane, kerosene, town gas, and the like, and is conducted to the catalytic layer. As for the material of the reactor filled with the catalyst, corrosive materials such inconel, hastelloy, and the like, are preferable. As for the structure of the alkali washing vessel, a type of the vessel wherein alkali solution is sprayed for washing the gas is preferable because clogging of pipes by deposition of crystals is hardly generated. A method wherein the gas produced by the decomposition is bubbled into an alkaline solution, or a method wherein the gas produced by the decomposition is washed in a packed tower, can be used.

The treating apparatus for decomposition relating to the present invention can be portable by a truck or another vehicle. Places where the above apparatus to be carried into are such as a junk yard for wasted refrigerators automobiles, and the others, and store houses for cylinders filled with the organohalogen compounds.

In accordance with the treating method of the present invention, the catalyst is hardly deteriorated. Therefore, an exchange operation of the catalyst is unnecessary or very scarce.

DESCRIPTION OF THE PREFERRED EMBODIMENTS

Hereinafter, embodiments of the present invention are explained, but the scope of the present invention is not restricted by the embodiments.

(Embodiment 1)

In the present embodiment, dependence of catalytic activity on ratio of Ti to W, and various kinds of objective gases for treating, is explained in connection with the catalyst prepared by the impregnation method.

(Experiment 1)

Catalytic activity was compared using the catalyst of the present invention having an atomic ratio of Ti and W of 8:2 (mol %) and a catalyst of a comparative example having an atomic ratio of Ti and W of 9.5:0.5 (mol %) by decomposing treatment of an organohalogen compound composed of CFC 12.

The catalyst of the present invention was prepared by the steps of pulverizing granular titanium oxide (made by Sakai Chemical Co. CS-224) of 2~3 mm in diameter, sieving the pulverized granules to be 0.5~1 mm in diameter, drying at 120° C. for 2 hours, subsequently, impregnating the titanium oxide granules into a hydrogen peroxide aqueous solution dissolving ammonium paratungstate 82.2 gram per 100 grams of titanium oxide, drying at 120° C. for 2 hours, and calcining at 500° C. for 2 hours.

In order to examine cross sections of the catalyst, the catalyst was mounted into a resin of which main component was epoxy resin. A white layer was observed at boundaries of the granular catalyst and the resin by SEM (scanning electron microscope) observation of the cross section of the catalyst. The white layer was confirmed as W component by an observation with electron microprobe analyzer. Thickness of the white layer was about $10^5$ Å. As a result of analysis, it was revealed that the catalyst had an atomic ratio of Ti and W of 8:2 (mol %), and contained S component 6.9 mol % to Ti atoms. The S component was confirmed to be as sulfate.

The preparing method of the catalyst of the comparative example was the same as the preparing method of the catalyst of the present invention except impregnating the titanium oxide granules into a hydrogen peroxide aqueous solution dissolving ammonium paratungstate 17.3 grams instead of 82.2 gram per 100 grams of titanium oxide. The catalyst of the comparative example had an atomic ratio of Ti and W of 9.5:0.5 (mol %), and contained S component 6.9 mol % to Ti atoms. The S component was sulfate. The cross section of the catalyst of the comparative example was observed by scanning electron microscope. However, no white layer was observed. Because the amount of tungsten oxide is small, tungsten oxide existed only inside of the titania granules and the tungsten oxide was not observed at the surface of the titania granules.

The experiment of the decomposing treatment of the organohalogen compound CFC 12 was performed as follows;

A cylinder of 16 mm in diameter made of inconel was used as a reactor, a catalytic layer was arranged at the middle of the reactor, and a thermocouple protecting tube of 3 mm in outer diameter made of inconel was inserted into the inside of the reactor. The temperature of the catalyst was determined by the thermocouple during the decomposing treatment. The reactor was heated by an electric furnace. Water vapor was adjusted by supplying a designated amount of pure water to the upper part of the reactor by a pump to evaporate.

The composition of the objective treating gas was as follows;

| | |
|---|---|
| CFC 12 | 3% by volume |
| water vapor | 15% by volume |
| oxygen | 10~20% by volume |
| nitrogen | residual |

The objective treating gas having the above composition was supplied to the reactor, gas, produced by decomposition, passing through the catalytic layer was bubbled into an alkali aqueous solution, and the concentration of CFC 12 in the gas passing through the alkali aqueous solution was determined by FID (flame ionization detector) gas chromatography. The space velocity of the gas was 3,000/hour, and the temperature of the catalyst in the reactor was 440° C. Conversion rate of the organohalogen compound was calculated by the following equation;

Conversion rate=1−(the amount of organohalogen compound at outlet/the amount of supplied organohalogen compound)×100%

Figure 1:
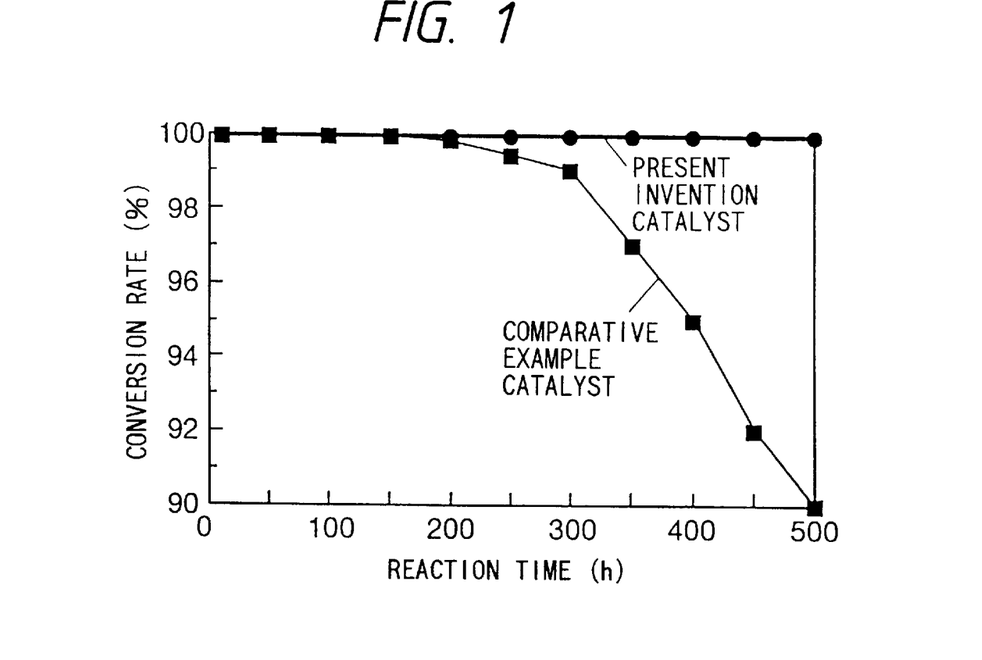
FIG. 1 is a graph indicating a relationship between conversion rate of the organohalogen compound and reaction time.

Variation of catalytic activity of the catalyst of the present invention and the comparative example catalyst during a continuous 500 hours test is shown in FIG. 1. The abscissa of FIG. 1 indicates the reaction time, and the ordinate indicates conversion rate of the organohalogen compound. The activity of the catalyst of the present invention did not decrease during the continuous 500 hours test, but the activity of the catalyst of the comparative example decreased after 200 hours in the test. Deposition of $TiOF_2$ was observed at the outlet of the gas produced by decomposition, located at the lower portion of the reactor filled with the comparative example catalyst.

(Experiment 2)

Figure 2:
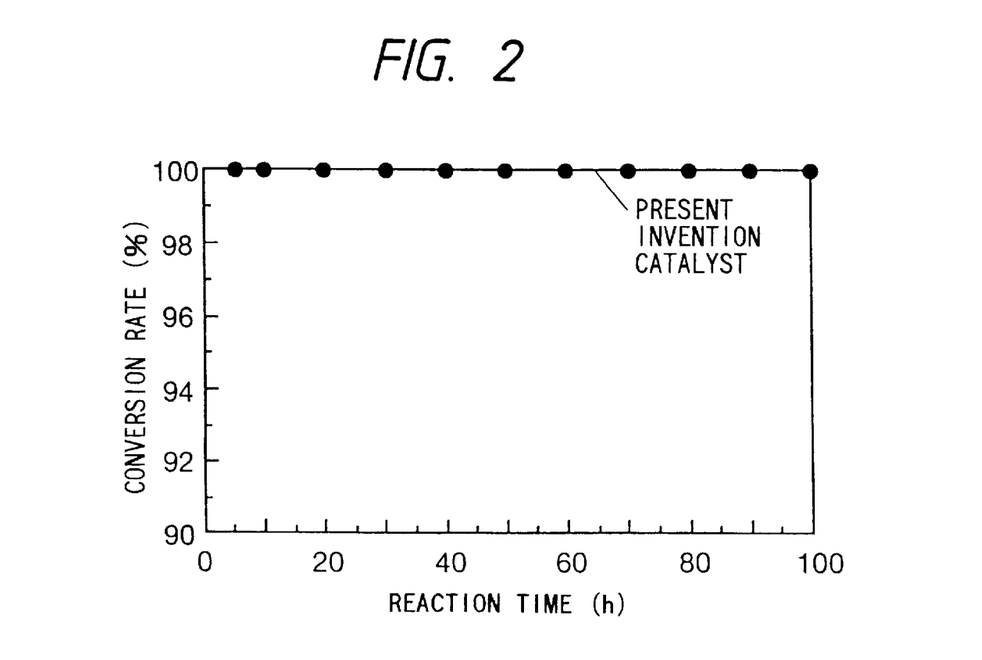
FIG. 2 is a graph indicating a relationship between conversion rate of the organohalogen compound and reaction time.

The activity of the catalyst of the present invention prepared in the above experiment 1 was examined with changing the objective treating gas to CFC 113 which has two carbon atoms. The result of the examination is indicated in FIG. 2. The testing conditions were the same as the experiment 1 except the reaction time. In this case, the reaction time was continuous 100 hours. The catalyst of the present invention also indicated a high activity for decomposing treatment of CFC 113.

(Experiment 3)

The activity of the catalyst for decomposing treatment of CFC 12 was examined with changing the atomic ratio of Ti and W. The catalyst was prepared by the same method as the experiment 1. Concentration of CFC 12 was made higher as 6% by volume than that of the experiment 1. Other testing conditions were the same as the experiment 1.

Figure 3:
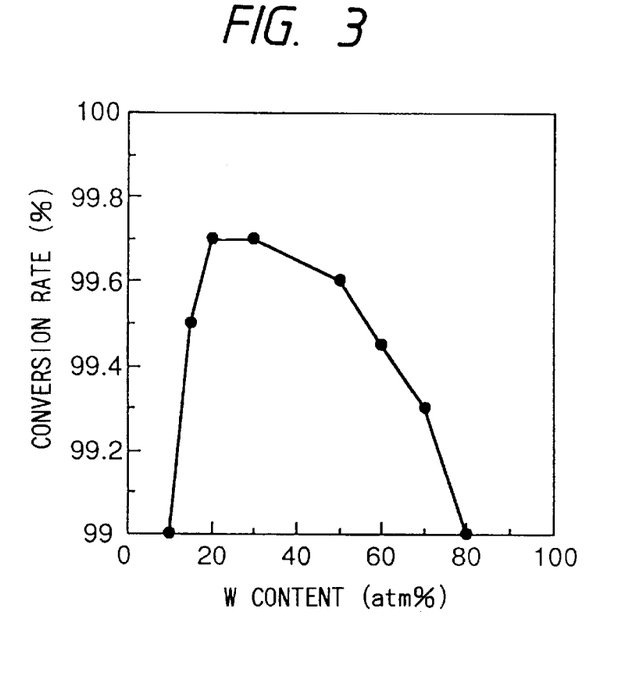
FIG. 3 is a graph indicating a relationship between conversion rate of the organohalogen compound and tungsten content.

FIG. 3 indicates a relationship between conversion rate of CFC 12 and containing ratio of Ti and W. The conversion rate was determined at two hours after starting of the reaction. The catalyst of the present invention containing W in a range of 10~80 mol % indicated a high conversion rate as at least 99% . In UNEP (United Nations Environment Project), the conversion rate at least 99% is deemed as an authorized treating method for CFC, and the catalyst of the present invention satisfies the above condition.

Figure 4:
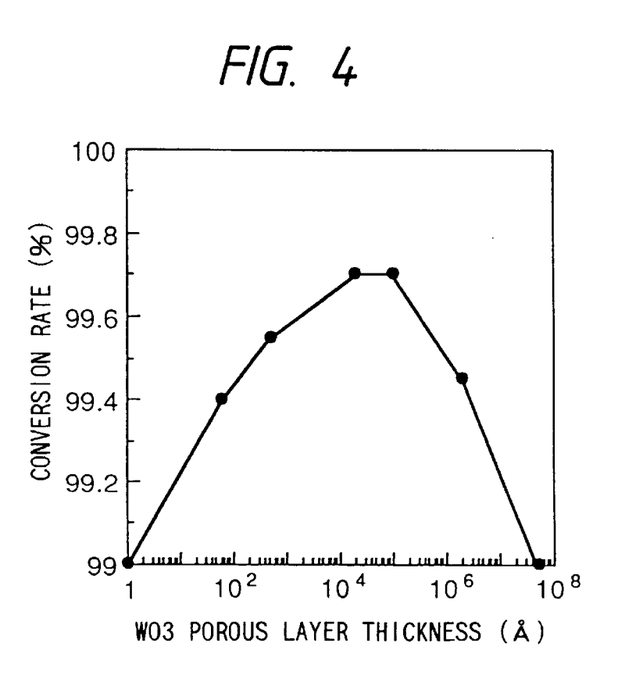
FIG. 4 is a graph indicating a relationship between conversion rate of the organohalogen compound and thickness of the $WO_3$ porous layer.

Thickness of the porous layer composed of $WO_3$ varies depending on W content. FIG. 4 indicates a relationship between the thickness of the $WO_3$ porous layer and the conversion rate of the organohalogen compound. The conversion rates were determined at two hours after starting of the reaction as same as FIG. 3.

(Experiment 4)

Figure 5:
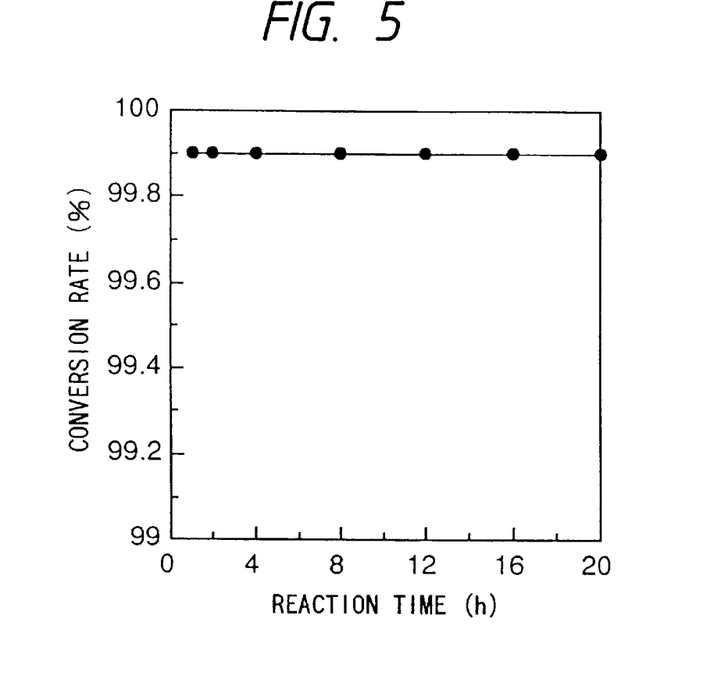
FIG. 5 is a graph indicating a relationship between conversion rate of the organohalogen compound and reaction time.

The activity of the catalyst of the present invention prepared in the above experiment 1 was examined with changing the objective treating gas to CFC 11. In the composition of the objective treating gas, concentration of the CFC 11 was 3% by volume. The testing conditions were the same as the experiment 1 except the reaction time. In this case, the reaction time was continuous 20 hours. The result of the examination is indicated in FIG. 5. The conversion rate of CFC 11 reached at 99.9%, and decrease of the activity of the catalyst was not observed at all.

(Experiment 5)

The activity of the catalyst of the present invention prepared in the above experiment 1 was examined with changing concentration of the objective treating gas. The composition of the objective treating gas was the same as that of the experiment 1 except varying the concentration of CFC 12 in a range of 1~10% by volume.

Figure 6:
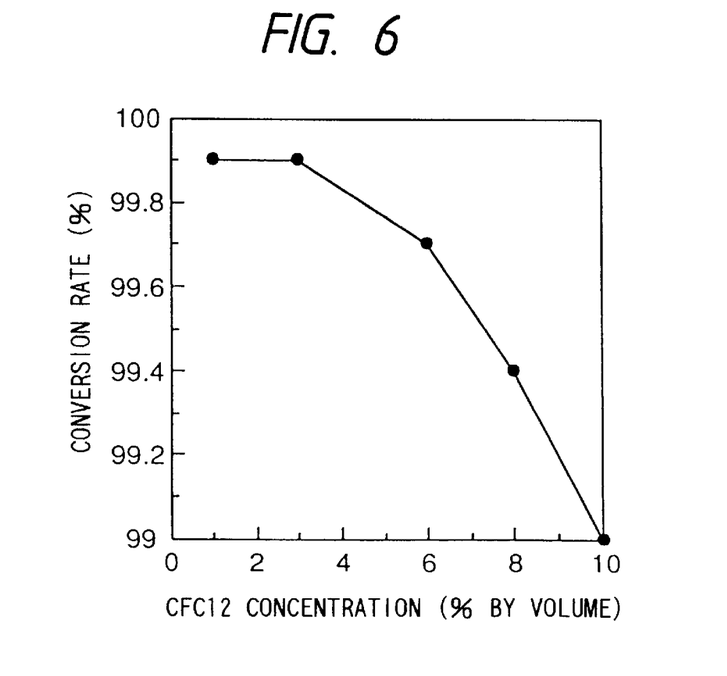
FIG. 6 is a graph indicating a relationship between conversion rate of CFC 12 and CFC 12 concentration.

The result of the examination is indicated in FIG. 6. The conversion rate was determined at one hour after starting of the reaction. A tendency that the conversion rate of CFC 12 lowers as the concentration of CFC 12 in the treating gas increases is observed. The catalyst of the present invention has a high conversion rate as at least 99% at the space velocity of 3,000/hour under a condition that the concentration of CFC 12 is in a range which does exceed 10% by volume.

(Experiment 6)

The activity of the catalyst of the present invention prepared in the above experiment 1 was examined with changing reaction temperatures at 440° C. and 600° C. The experiment was performed with respective two kinds of CFC such as CFC 11 and CFC 12. The concentrations of the CFC 11 and the CFC 12 were both 3% by volume. Other experimental conditions were the same as the experiment 1.

Figure 7:
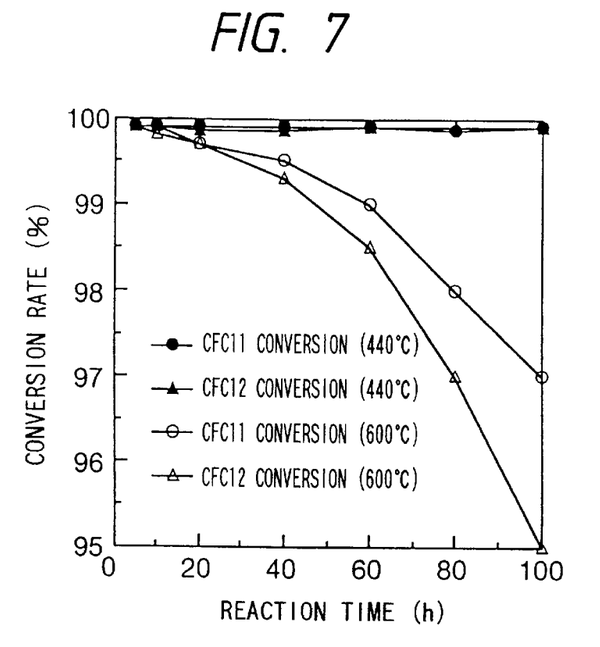
FIG. 7 is a graph indicating a relationship between conversion rate of the organohalogen compound and reaction time.

The result of the examination is indicated in FIG. 7. The conversion rate was determined at one hour after starting of the reaction. When the reaction temperature was 440° C., no decrease of the activity was observed during continuous 100 hours test. However, when the reaction temperature was 600° C., the activity of the catalyst decreased as the reaction time elapsed.

(Embodiment 2)

In the present embodiment, dependency of the activity of the catalyst on materials such as $TiO_2$ or W, and on preparing methods of the catalyst was examined. The decomposing treatment was performed on CFC 12. The method of the experiment and the composition of the objective treating gas were the same as the experiment 1 except the reaction time. The reaction time was continuous 10 hours.

(Experiment 7)

Figure 8:
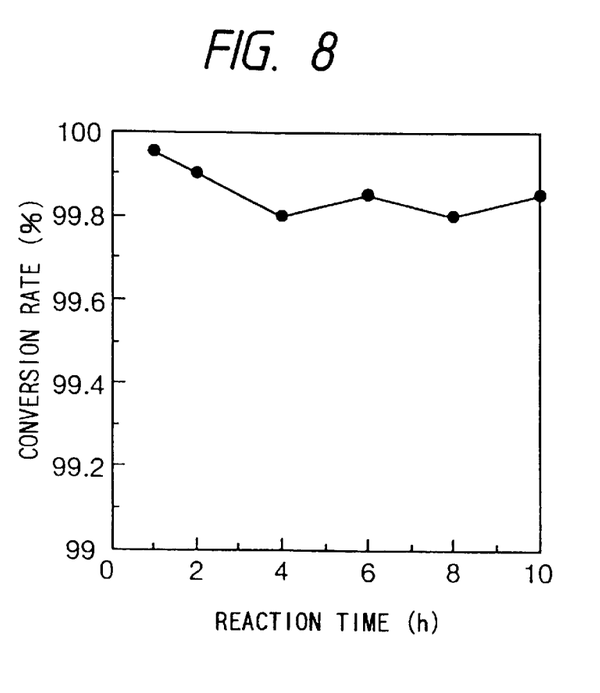
FIG. 8 is a graph indicating a relationship between conversion rate of the organohalogen compound and reaction time.

The activity of the catalyst was examined with changing size of the $TiO_2$ granules. Concretely, the catalyst was prepared by the steps of drying commercially available granular $TiO_2$ (made by Sakai Chemical Co., CS-300) having a diameter in a range of 0.5~1mm at 120° C. for two hours, and impregnating hydrogen peroxide aqueous solution dissolving ammonium paratungstate 82.2 g into the $TiO_2$ granules 100 g, drying again the $TiO_2$ granules at 120° C. for 2 hours after the impregnation, and calcining the $TiO_2$ granules at 500° C. for 2 hours. A relation between the conversion rate of CFC 12 and the reaction time when the catalyst prepared by the above described method was used is indicated in FIG. 8. The higher conversion rate was obtained with the catalyst having small and uniform diameters as the catalyst in the experiment 1 than the present catalyst, but the difference of the conversion rate is small.

(Experiment 8)

The activity of the catalyst which was prepared using $TiO_2$ granules manufactured by granulation was examined.

As for raw material titania, granular titanium oxide (made by Sakai Chemical Co., CS-224) of 2~3 mm in diameter was pulverized in an automatic mortar, to be a powder of 0.5 mm or less in diameter, the powder was dried at 120° C. for 2 hours, and calcined at 500° C. for 2 hours. Then, the powder was loaded into a die and fabricated by pressing with a pressure of 500 kgf/cm². The pressure for the fabrication is preferably in a range of 250~3000 kgf/cm². The fabricated body was crushed and sieved to obtain titanium oxide granules of 0.5~1 mm in diameter. Then, a hydrogen peroxide aqueous solution dissolving ammonium paratungstate 82.2 g was impregnated into the obtained $TiO_2$ granules 100 g. After the impregnation, the $TiO_2$ granules were dried at 120° C. for 2 hours, and calcined at 500° C. for 2 hours. As a result of analyzing components existing at the cross section of the obtained catalyst by SEM analysis and electron microprobe analyzer, an existence of the porous layer made of $WO_3$ at the surface of the $TiO_2$ granules was confirmed.

Figure 9:
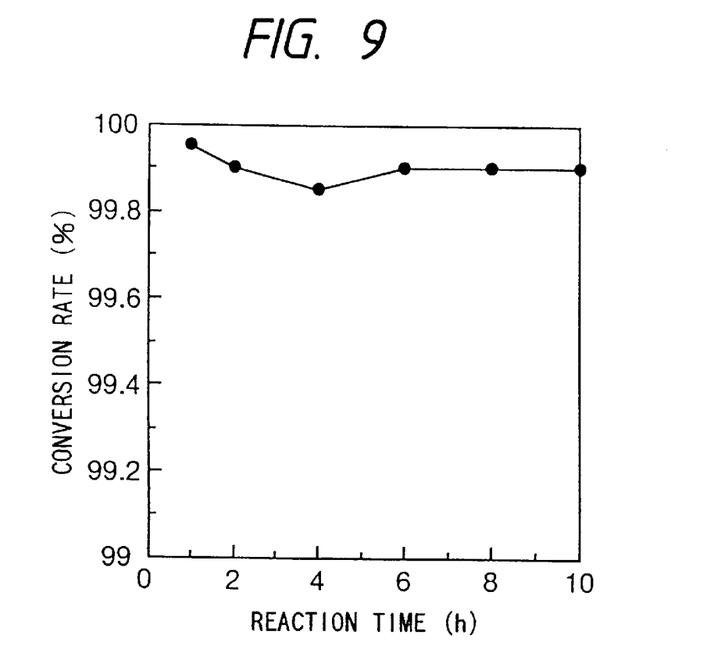
FIG. 9 is a graph indicating a relationship between conversion rate of the organohalogen compound and reaction time.

A relationship between the conversion rate of CFC 12 and the reaction time is indicated in FIG. 9. The catalyst using titania granules obtained by granulation as for raw material has relatively small fluctuation in the conversion rate in accordance with relapsing time. Therefore, the titanium oxide granules obtained by granulation are adequate as for the raw material of the catalyst.

(Experiment 9)

In the present experiment, the activity of the catalyst which was prepared using $TiO_2$ granules manufactured by granulation was again examined. However, a method for granulation differs from the experiment 8.

Concretely, granular titanium oxide (made by Sakai Chemical Co., CS-224) of 2~3 mm in diameter was pulverized in an automatic mortar, and the powder was dried at 120° C. for 2 hours. Then, the dried titanium oxide powder 100 g was mixed sufficiently with ammonium paratungstate 41.1 g using a kneader with adding distilled water. After drying the obtained slurry at 150° C. for 2 hours, the obtained powder was calcined at 500° C. for 2 hours. Then, the obtained powder was loaded into a die and fabricated by pressing with a pressure of 500 kgf/cm². The fabricated body was crushed and sieved to obtain titanium oxide granules of 0.5~1 mm in diameter. Then, a hydrogen peroxide aqueous solution containing ammonium paratungstate 41.1 g was impregnated into the obtained $TiO_2$ granules 100 g. The catalyst was prepared by drying the $TiO_2$ granules at 120° C. for 2 hours after the impregnation, and calcining at 500° C. for 2 hours. As a result of analyzing components existing at the cross section of the obtained catalyst by SEM analysis and electron microprobe analyzer, an existence of the porous layer made of $WO_3$ at surface of the $TiO_2$ granules was confirmed.

Figure 10:
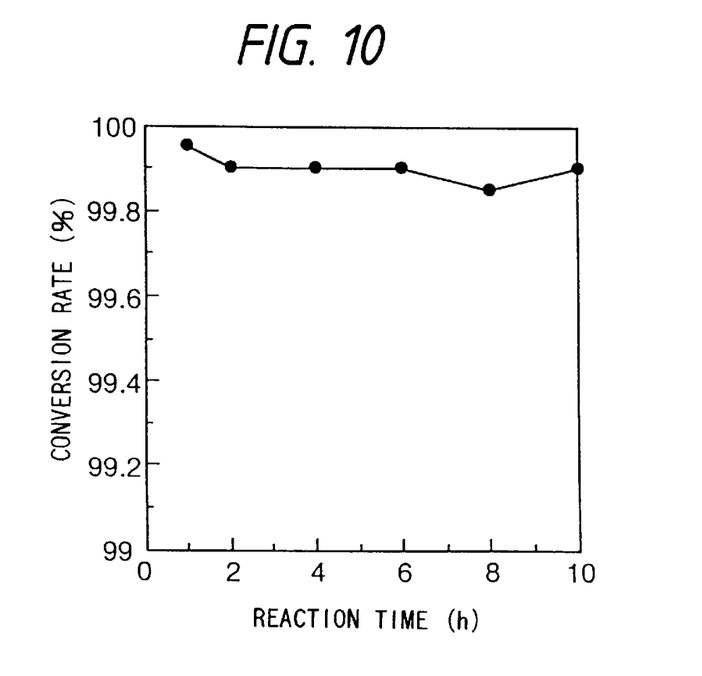
FIG. 10 is a graph indicating a relationship between conversion rate of the organohalogen compound and reaction time.

A relationship between the conversion rate of CFC 12 and the reaction time is indicated in FIG. 10. The titania granules obtained by the above described method for granulation are confirmed to be adequate as for raw material of the catalyst.

(Experiment 10)

In the present experiment, the activity of the catalyst which was prepared by mixing dried $TiO_2$ granules and ammonium paratungstate with adding hydrogen peroxide, instead of the method used in the above experiment 9 wherein titanium oxide granules were impregnated with hydrogen peroxide aqueous solution dissolving ammonium paratungstate, was examined. By using hydrogen peroxide, tungsten can be dispersed more homogeneously.

Figure 11:
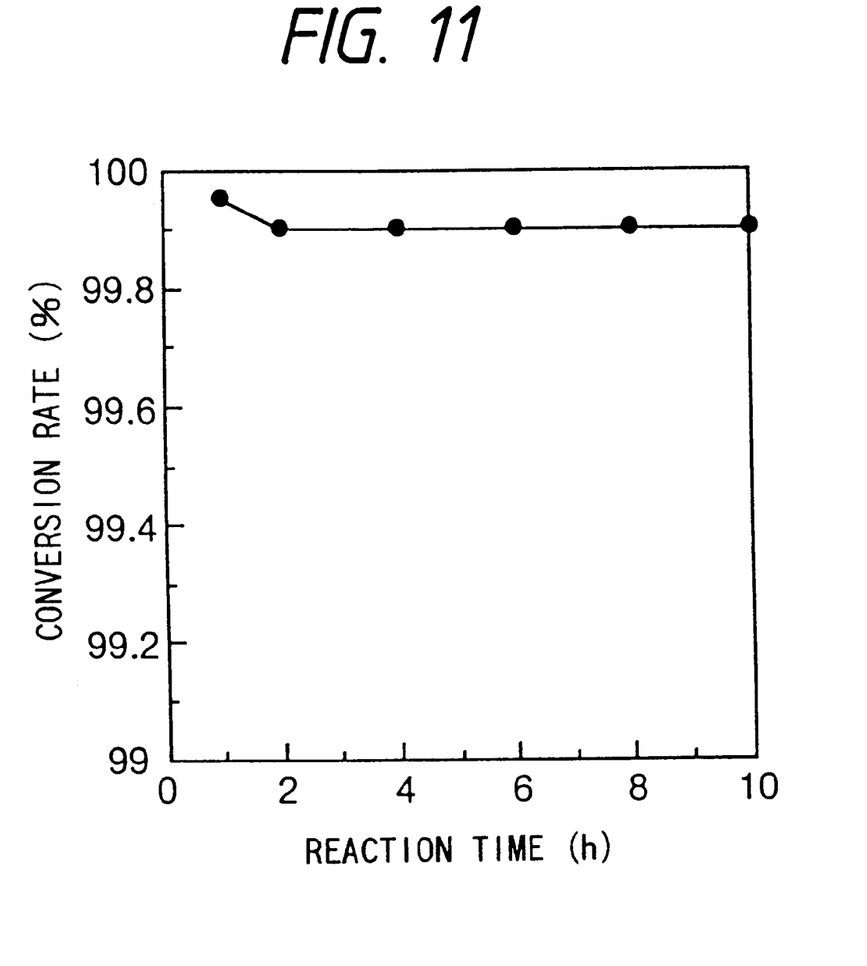
FIG. 11 is a graph indicating a relationship between conversion rate of the organohalogen compound and reaction time.

The conversion rate of CFC 12 by the present catalyst is indicated in FIG. 11.

(Experiment 11)

In the present experiment, the activity of the catalyst which was prepared by an impregnation method other than the experiment 1 was examined.

The catalyst was prepared by impregnating a hydrogen peroxide aqueous solution containing ammonium paratungstate 82.2 g into titanium oxide granules 100 g, drying the titanium oxide granules at 120° C. for 2 hours after the impregnation, and calcining at 500° C. for 2 hours. The conversion rate of CFC 12 by the present catalyst was 99.9% at 50 hours after starting up of the reaction.

(Experiment 12)

In the present experiment, the activity of the catalyst which was prepared from other tungsten raw material was examined.

The catalyst was prepared by impregnating a hydrogen peroxide aqueous solution containing phosphotungstic acid 75.6 g into titanium oxide granules 100 g used in the experiment 1, drying the titanium oxide granules at 120° C. for 2 hours after the impregnation, and calcining at 500° C. for 2 hours. The conversion rate of CFC 12 by the present catalyst was 99.9% at 50 hours after starting up of the reaction.

(Experiment 13)

In the present experiment, the activity of the catalyst which contains sulfur was examined.

The catalyst was prepared by impregnating a hydrogen peroxide aqueous solution containing paratungstate 82.2 g into titanium oxide granules 100 g used in the experiment 1, drying the titanium oxide granules at 120° C. for 2 hours after the impregnation, impregnating 0.1% sulfuric-acid 75 g into the titanium oxide granules, drying again the titanium oxide granules at 120° C. for 2 hours, and calcining at 500° C. for 2 hours. The conversion rate of CFC 12 by the present catalyst was 99.9% at 50 hours after starting up of the reaction.

(Embodiment 3)

Figure 12:
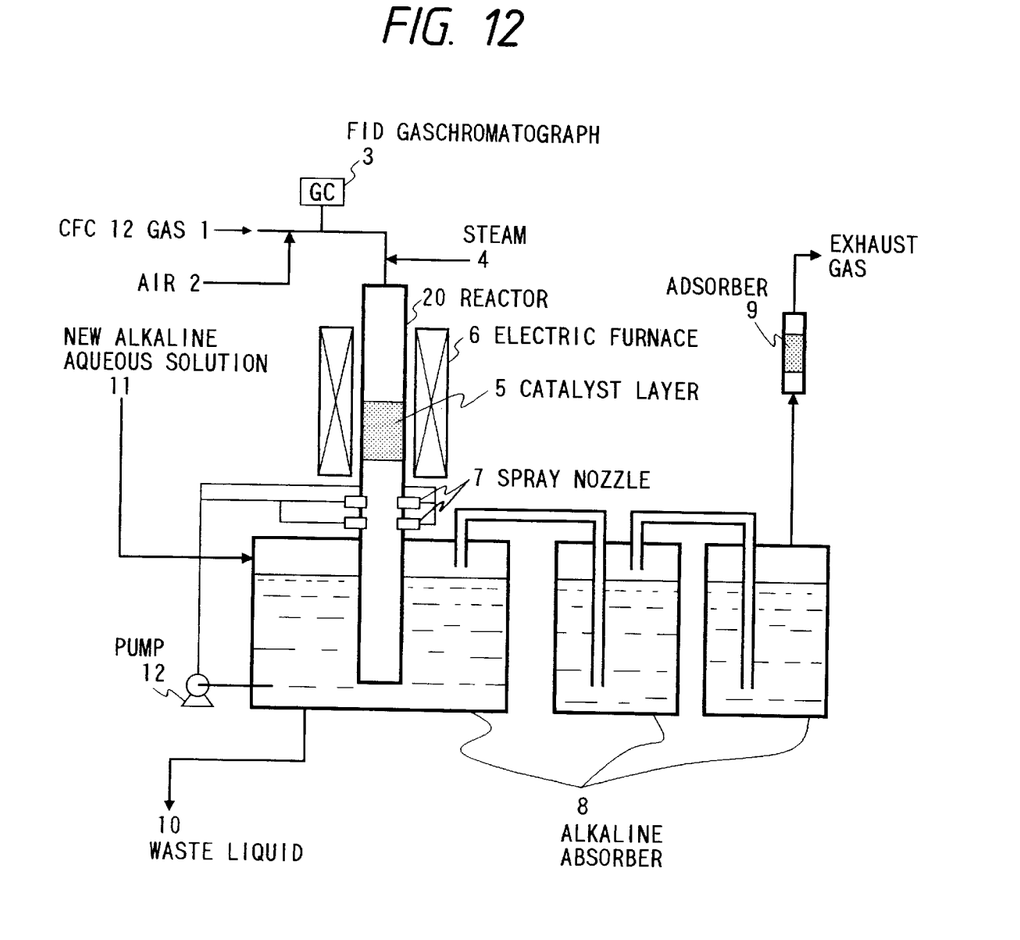
FIG. 12 is a schematic drawing indicating a composition of an apparatus for decomposing organohalogen compound for performing the method of the present invention.

In the present embodiment, an apparatus for performing the treating method for decomposing organohalogen compound relating to the present invention is explained referring to FIG. 12.

Organohalogen compound gas 1 (taken CFC 12 for an example in this case) recovered from wasted refrigerators, wasted automobiles, and the like, has its concentration determined by an analyzer 3 such as FID gaschromatography, and is diluted with air 2 to adjust the CFC 12 concentration to about 3% by volume. After adding water vapor 4 of 5 times moles of the CFC 12 moles to the adjusted CFC 12 gas, the CFC 12 gas is conducted to a reactor 20 having a catalyst layer 5 filled with the catalyst relating to the present invention. The space velocity (space velocity=gas flow rate (ml/h)/volume of the catalyst (ml)) of the gas in this case is in a range of 5,000~100,000/hour. The catalyst layer 5 is heated by an electric furnace 6. As for a method for heating the catalyst, a method conducting high temperature gas, which is obtained by burning propane gas and others, into the reactor can be used. Decomposition produced gas of the organohalogen compound is contacted with sodium hydroxide aqueous solution sprayed from spray nozzles 7 and bubbled into alkaline absorbers 8. The gas passed through the alkaline absorbers 8 is conducted into an adsorber 9 which is filled with active carbon, and the like, and released to atmosphere. The liquid sprayed from the spray nozzles 7 can be only water, or slurry such as calcium carbonate slurry. Wasted alkaline aqueous solution 10 in the alkaline absorbers 8 is taken out regularly, and changed with new alkaline solution 11. As for the alkaline solution to be sprayed from the spray nozzles, the alkaline solution in the alkaline absorber 8 is circulated by a pump 12 and used.

(Embodiment 4)

Figure 13:
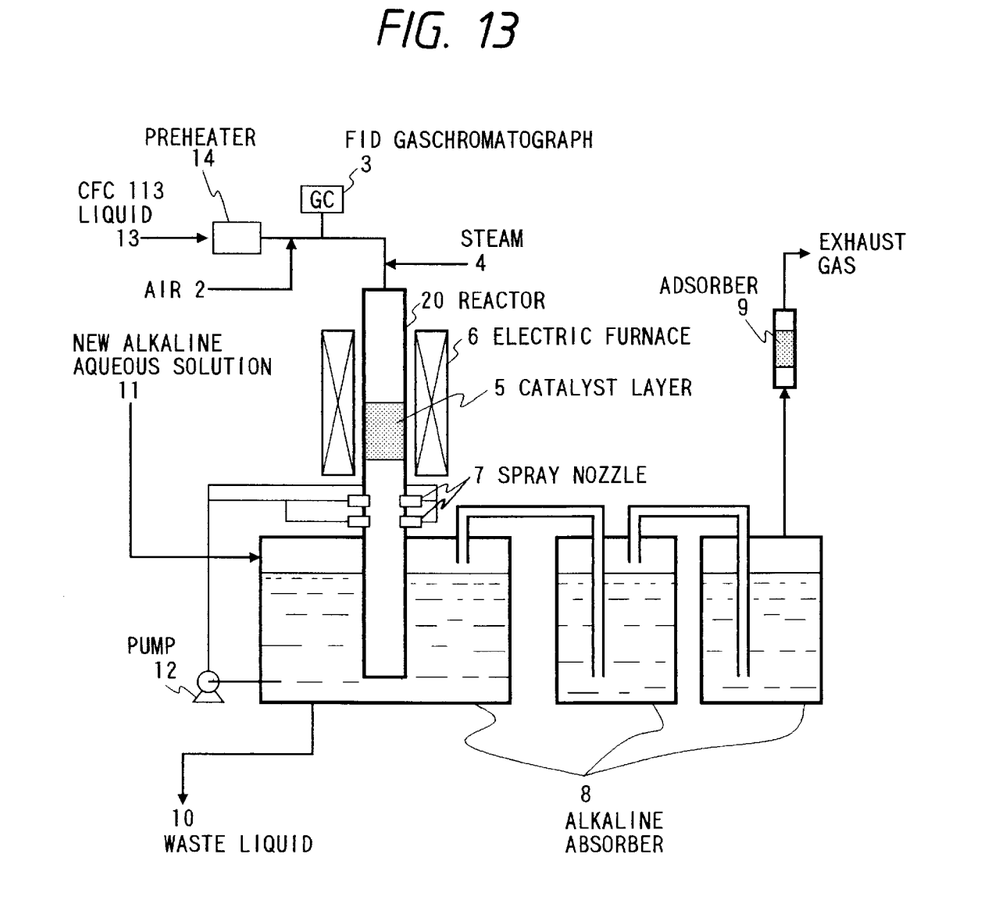
FIG. 13 is a schematic drawing indicating another embodiment of the apparatus for decomposing organohalogen compound.

In the present embodiment, an apparatus for performing the treating method of the present invention is explained when the organohalogen compound is liquid at a room temperature referring to FIG. 13.

The apparatus is provided with further a preheater 14 to the decomposing apparatus for organohalogen compound in the embodiment 3. When the organohalogen compound is liquid at a room temperature such as CFC 113 liquid 13, the liquid is vaporized at the preheater 14. Then, its concentration is determined by an analyzer such as a FID gaschromatography, and the concentration of CFC 113 is adjusted to about 3% by volume by diluting with air. Subsequently, the CFC is treated by the same manner as the embodiment 3.

In accordance with the present invention, organic compounds containing any of fluorine, chlorine, and bromine such as chlorofluorocarbons (CFCs), trichloroethylene, methyl bromide, halon, and the like, can be decomposed with a high efficiency, and the activity of the catalyst can be maintained for a long time.

What is claimed is:

1. A treating apparatus for decomposing organohalogen compounds used for performing a decomposing method of the organohalogen compounds with catalyst comprising:

a reactor filled with a catalyst, means for adding air to gas flow containing organohalogen compounds, means for conducting the gas flow containing said organohalogen compounds and air into said reactor, means for heating said reactor so that the gas flow contacts with the catalyst at a temperature in a range of 200~500° C., means for adding an effective amount of water vapor to the gas flow for decomposing said organohalogen compounds, and alkaline absorbers for washing organohalogen decomposition products, which are generated by contacting said gas flow with the catalyst filled into said reactors, with an alkaline aqueous solution in order to neutralize a part of carbon dioxide and halogenated hydrogen in said organohalogen decomposition products, wherein said catalyst comprises titania and tungsten oxide, the titania having a surface, said catalyst has an atomic ratio of Ti and W in a range from 20 mol % to 95 mol % Ti and from 5 mol % to 80 mol % W, and at least the surface of said titania is covered with a porous layer of tungsten oxide.

2. A treating apparatus for decomposing organohalogen compounds as claimed in claim 1, wherein a means for adsorbing carbon monoxide in said decomposition products which are not neutralized at the alkaline absorbers is provided downstream of said alkaline absorbers.

3. A treating apparatus for decomposing organohalogen compounds as claimed in claim 1, wherein the porous layer of tungsten oxide covers the surface of the titania so as to prevent poisoning of the titania by fluorine.

4. A treating apparatus for decomposing organohalogen compounds as claimed in claim 1, wherein said catalyst consists essentially of titania and tungsten oxide.

5. A treating apparatus for decomposing organohalogen compounds as claimed in claim 1, wherein said porous layer has a thickness of 1 Å to 5 mm.

6. A treating apparatus for decomposing organohalogen compounds as claimed in claim 1, wherein said catalyst has an atomic ratio of Ti and W in a range 40 mol % to 90 mol % Ti and from 10 mol % to 60 mol % W.

7. A treating apparatus for decomposing organohalogen compounds as claimed in claim 1, wherein said catalyst has an atomic ratio of Ti and W in a range 20 mol % to 85 mol % Ti and from 15 mol % to 80 mol % W.

8. A treating apparatus for decomposing organohalogen compounds as claimed in claim 1, wherein said reactor is selected from the group consisting of a fixed bed reactor, a fluidized bed reactor and a mobile bed reactor.

9. A treating apparatus for decomposing organohalogen compounds as claimed in claim 1, further comprising a preheater upstream of the reactor.

10. A treating apparatus for decomposing organohalogen compounds as claimed in claim 1, wherein said catalyst is a catalyst prepared by a method including impregnating $TiO_2$ with a solution containing W, and wherein said catalyst has an atomic ratio of Ti and W in a range from 20 mol % to 90 mol % Ti and 10 mol % to 80 mol % W.

11. A treating apparatus for decomposing organohalogen compounds as claimed in claim 10, wherein said catalyst is a catalyst prepared by a method including the further step of calcining the $TiO_2$ impregnated with said solution, to convert the W to $WO_3$.

* * * * *